W. R. CLARK.
ELECTRIC FURNACE.
APPLICATION FILED SEPT. 8, 1919.
1,370,632.
Patented Mar. 8, 1921.
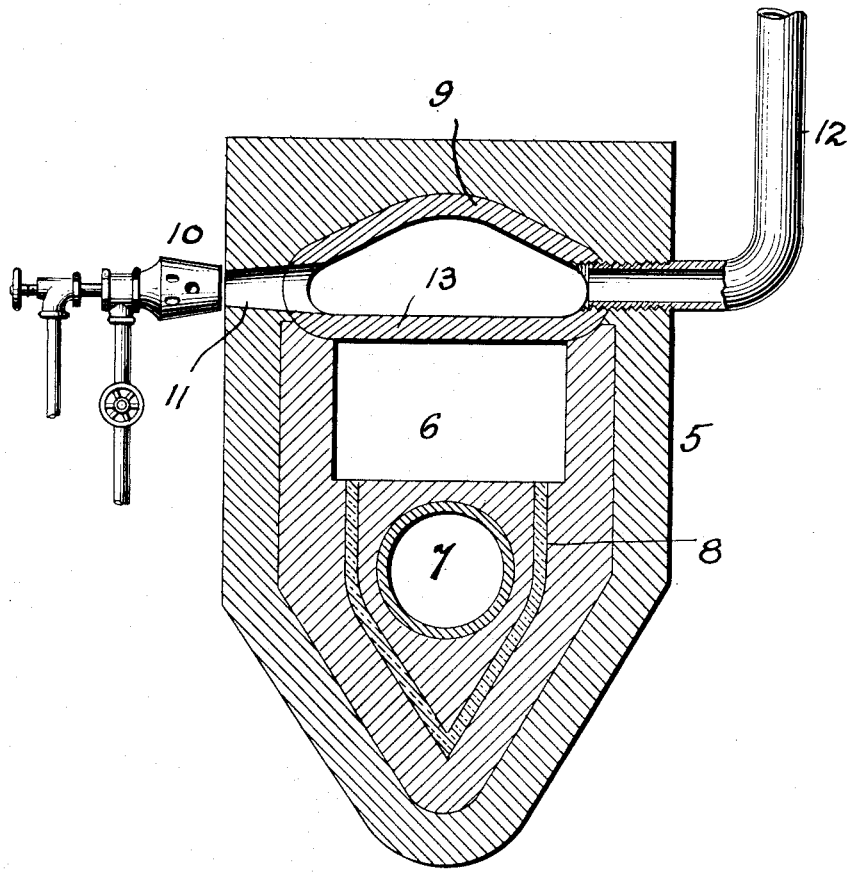
Inventor.
Walter R. Clark,
by [signature]
his Attorney.

UNITED STATES PATENT OFFICE.

WALTER R. CLARK, OF BRIDGEPORT, CONNECTICUT, ASSIGNOR TO BRIDGEPORT BRASS COMPANY, OF BRIDGEPORT, CONNECTICUT, A CORPORATION OF CONNECTICUT.

ELECTRIC FURNACE.

1,370,632. Specification of Letters Patent. Patented Mar. 8, 1921.

Original application filed May 6, 1918, Serial No. 232,753. Divided and this application filed September 8, 1919. Serial No. 322,557.

*To all whom it may concern:*

Be it known that I, WALTER R. CLARK, a citizen of the United States, residing in Bridgeport, in the county of Fairfield and State of Connecticut, have invented certain new and useful Improvements in Electric Furnaces, of which the following is a full, clear, and exact description.

This application relates to electric furnaces, and the same is a division of my application, Serial No. 232,753, filed May 6, 1918.

In the melting of brass turnings, shavings and similar scrap, the electric furnace of the induction type has given fairly successful and satisfactory results, particularly where a secondary consisting of a part of the molten metal of the charge is located below the main body of the charge or bath and so arranged as to promote the circulation of the bath by motor effect. It has been found, however, that in the melting of brass and similar scrap in a furnace of this kind, there is a tendency for the upper surface of the metal bath to become chilled and thereby to become hardened or incrusted, forming a bridge or arch that is separated from the molten part of the charge. Such a chilling and incrustation of the charge surface, forming an inert layer on top of the bath, is caused by the fact that the brass chips usually have a film of oil on the same or more or less dirt, which acts as an insulator in preventing the flow of heat into such chips; and the air in the interstices between the fragments of scrap also acts as an insulator which separates them from the bath beneath. Naturally the separation of the upper part of the charge from the lower part causes a considerable part of the metal to remain unmelted throughout the heating of the charge or for a longer period than is conducive to proper furnace operation, and the efficiency of the furnace is cut down, the output of molten metal being less than it should be, and the power consumption greater.

One of the primary objects of the present invention is to provide an improved furnace for melting brass and similar scrap, having novel means located above the surface of the charge, adjacent the roof of the furnace chamber, for maintaining the surface of the charge at such a temperature as to prevent chilling of the same.

To this and other ends, the invention consists in the novel features and combinations of parts to be hereinafter described and claimed.

The accompanying drawing is a somewhat diagrammatic, vertical sectional view of an electric induction furnace embodying the invention.

In the drawing, I have shown an electric induction furnace of the type wherein a secondary of molten metal is located beneath the main part of the charge or bath, and in communication therewith, the arrangement being such that the metal in the furnace is kept in circulation while the furnace is in operation by motor effect in said channel. The furnace body 5 has an interior chamber or basin 6. I have omitted from the drawing the primary core, and the primary coil, which are usually located in an opening 7, beneath the chamber 6. I have shown, however, the secondary channel 8, which is in communication with the main furnace chamber at the ends of said channel, at opposite sides of the chamber. The molten metal of the charge within the channel 8 forms the secondary of a transformer, being located in close proximity to the primary core and coil (not shown) in the opening 7. At the lower part of the furnace, the secondary channel preferably has an acute angle formed therein for the creation of motor effect, which promotes and maintains the circulation of the entire charge. The channel 8 is preferably located in a vertical plane and is formed in a body of asbestos cement, or similar insulating material, within the lower part of the furnace.

The brass or other scrap to be melted is introduced into the furnace chamber 6 in the usual manner, making contact with a ribbon or strip of metal in the secondary channel. The primary is then excited and the greater part of the charge in the furnace chamber is melted by contact with the metal of the secondary channel which rapidly becomes molten and is circulated in contact with other parts of the bath, the metal being driven out of the channel at the upper ends thereof by motor effect and being constantly replaced.

The circulation promoted in this manner in the lower part of the bath is quite efficient but, owing to the oil and dirt on the scrap metal and the air in the interstices between the fragments, the upper part of the charge may become insulated and separated from the lower part, forming a bridge or arch over the latter in the nature of a crust, which is not heated sufficiently to melt, as above pointed out. In order to overcome this drawback and the consequent loss of efficiency, I provide auxiliary heating means above the upper surface of the charge constituted by a retort 9 of refractory material or the like formed in or adjacent the roof portion of the furnace. This retort 9 serves as a combustion chamber and is heated interiorly by an oil burner 10 or the like, which in this instance is arranged exteriorly of the furnace and is adapted to project a jet of flame into the retort through an opening 11. The products of combustion pass off from the retort through a stack or chimney 12. In the example shown, the bottom wall 13 of the retort or combustion chamber lies directly above the furnace chamber 6 and forms a roof therefor, and by reason of the heating of said bottom wall 13 to a proper degree, determined by adjustment of the oil burner 17 or in some other convenient manner, the requisite amount of heat is radiated in a downward direction against the upper surface of the metal bath. In the particular instance under discussion, the object of the auxiliary heating means is to prevent the chilling of the upper part of the charge without prejudicially volatilizing the zinc or other volatile constituent or content of the charge. In the treatment of brass or other volatile metal, the auxiliary heating means is of relatively weak heating effect as compared to the induction element below the upper surface of the charge. The particular procedure adopted, however, will be varied under different conditions.

The furnace chamber should, of course, be provided with a charging door or the like and a discharge spout, but as these and similar features do not in themselves constitute a part of my invention, I have not considered it necessary to illustrate them.

Various changes may be made in the furnace structure herein particularly described without departing from the scope of my inventive idea, as set forth in the claims.

What I claim is:

1. In an electric furnace of the induction type having a secondary below the upper surface of the charge, a combustion chamber in the upper part of the furnace for preventing the chilling or incrustation of the upper surface of the charge.

2. In an electric furnace of the induction type having a secondary below the upper surface of the charge, a roof for the furnace chamber adapted to radiate heat downward, and means above said roof, but within the furnace structure, for heating the roof.

3. In an electric furnace having means located beneath the upper surface of the charge in the furnace chamber for heating the material, an oil burner for heating the furnace chamber roof.

4. In an electric furnace, a furnace chamber, means below the furnace chamber whereby the charge is heated, a roof for the furnace chamber, and means above the roof within the furnace body for heating the roof and thereby preventing the chilling or incrustation of the upper surface of the charge.

5. In an electric furnace, a furnace chamber, means below the furnace chamber whereby heat is imparted to the charge from beneath, a roof for the furnace chamber, and an oil burner for heating the roof from above.

6. In an electric furnace, a furnace chamber, and a heating chamber located above and immediately over the furnace chamber.

7. In an electric furnace, a furance chamber, means whereby the charge in said chamber may be electrically heated from below, and a heating chamber whereby the charge may be heated from above.

8. In an electric furnace, a chamber for receiving the charge, means whereby the charge may be heated from one side electrically, and means whereby the charge may be heated from an opposite side by products of combustion out of direct contact with the charge.

9. In an electric furnace, a furnace chamber, means below the level of the charge in the furnace chamber for heating such charge electrically from beneath, and a combustion chamber above but adjacent the furnace chamber through which products of combustion pass, without contact with the charge, for heating the upper surface of the latter.

10. An electric furnace of the induction type having a secondary below the upper surface of the charge and an auxiliary heating chamber above the charge.

11. An electric furnace of the induction type having a secondary below the upper surface of the charge and an auxiliary heating combustion chamber above the charge cut off from communication with the furnace chamber.

In witness whereof, I have hereunto set my hand, on the 3rd day of September, 1919.

WALTER R. CLARK.